United States Patent
Aoki et al.

(10) Patent No.: US 8,331,691 B2
(45) Date of Patent: Dec. 11, 2012

(54) IMAGE DATA PROCESSING APPARATUS AND IMAGE DATA PROCESSING METHOD

(75) Inventors: Kentarou Aoki, Tokyo (JP); Miyuki Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 743 days.

(21) Appl. No.: 12/480,198

(22) Filed: Jun. 8, 2009

(65) Prior Publication Data
US 2010/0002940 A1    Jan. 7, 2010

(30) Foreign Application Priority Data

Jul. 3, 2008    (JP) ................. 2008-174640

(51) Int. Cl.
*G06K 9/00*    (2006.01)
(52) U.S. Cl. ....................... 382/209; 382/118
(58) Field of Classification Search ........................ None
See application file for complete search history.

(56) References Cited

U.S. PATENT DOCUMENTS

| | | | |
|---|---|---|---|
| 2005/0198661 A1* | 9/2005 | Collins et al. .................... | 725/19 |
| 2006/0274949 A1* | 12/2006 | Gallagher et al. ............ | 382/228 |
| 2007/0116365 A1* | 5/2007 | Kloer ............................. | 382/190 |
| 2007/0237360 A1* | 10/2007 | Irie et al. ....................... | 382/103 |
| 2008/0085048 A1* | 4/2008 | Venetsky et al. .............. | 382/153 |
| 2008/0298643 A1* | 12/2008 | Lawther et al. ............... | 382/118 |

FOREIGN PATENT DOCUMENTS

| | | |
|---|---|---|
| CN | 101051389 A | 10/2007 |
| JP | 2003-46911 | 2/2003 |
| JP | 2005-33276 | 2/2005 |
| JP | 2006-276162 | 10/2006 |
| JP | 2007-49332 | 2/2007 |
| JP | 2007-88814 | 4/2007 |
| JP | 2007-281858 | 10/2007 |
| JP | 2008-11316 | 1/2008 |
| JP | 2008-90814 | 4/2008 |
| JP | 2005-341394 | 12/2008 |

OTHER PUBLICATIONS

U.S. Appl. No. 12/541,477, filed Aug. 14, 2009, Okada.

* cited by examiner

*Primary Examiner* — Andrew W Johns
*Assistant Examiner* — Siamak Harandi
(74) *Attorney, Agent, or Firm* — Oblon, Spivak, McClelland, Maier & Neustadt, L.L.P.

(57) ABSTRACT

An image-data processing apparatus. The image-data processing apparatus includes: an imaging section capturing an image of a subject and generating image data; a feature-extraction processing section extracting a visual feature from the generated image data; a feature-comparison processing section comparing a visual feature, having been extracted from recorded image data in a recording medium and related to the recorded image data, with the visual feature extracted by the feature-extraction processing section; and a control section reading image data having the visual feature extracted by the feature-extraction processing section from the recording medium on the basis of the comparison result.

14 Claims, 13 Drawing Sheets

FIG. 6

| FILE TYPE | NUMBER OF BYTES FROM THE BEGINNING | NUMBER OF DETECTED FACES | ATTRIBUTE DETECTION RESULT | PERSON IDENTIFICATION RESULT | HUMAN-BODY DETECTION RESULT | NUMBER OF DETECTED OBJECTS | DETECTED-OBJECT IDENTIFICATION RESULT |
|---|---|---|---|---|---|---|---|
| 0 | 104856 | 0 | NULL | NULL | NULL | 0 | NULL |
| 0 | 157284 | 0 | NULL | NULL | NULL | 1 | O |
| 1 | 209712 | 1 | XX | A | SEHWK | 1 | P |
| 1 | 261240 | 2 | XX, YY | A, C | SEHWK, SEHWK | 1 | P |
| 1 | 314568 | 2 | XX, YY | A, B | SEHWK, SEHWK | 2 | Q, R |
| ... | ... | ... | ... | ... | ... | ... | ... |

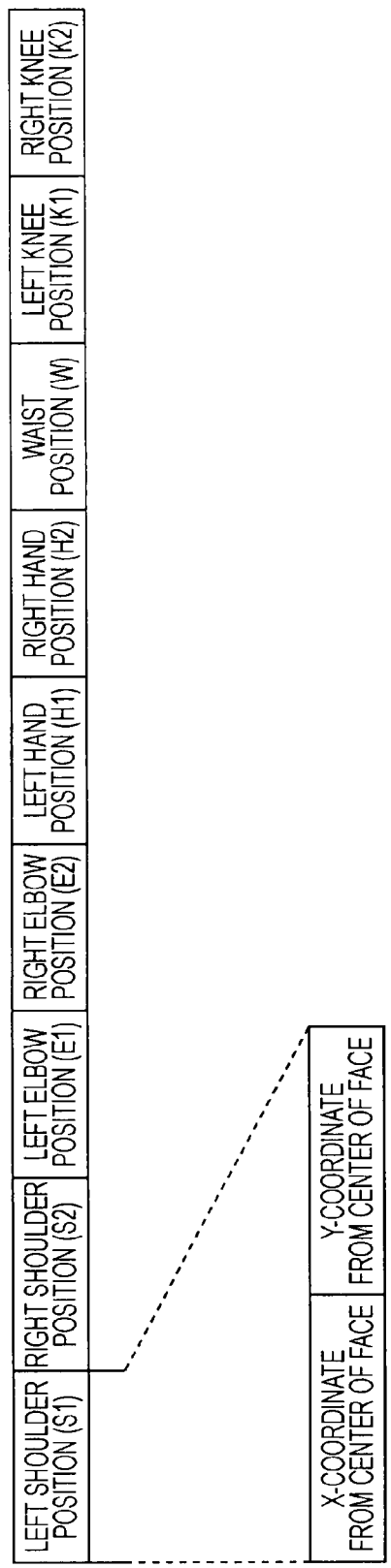

IMAGE DATA PROCESSING APPARATUS AND IMAGE DATA PROCESSING METHOD

BACKGROUND OF THE INVENTION

1. Field of the Invention

The present invention relates to an image-data processing apparatus and an image-data processing method. More particularly, the present invention relates to an image-data processing apparatus and an image-data processing method which enable a user to easily retrieve desired image data from a large volume of still image data and moving-image data stored in a recording medium, and to play back or edit the image data.

2. Description of the Related Art

In recent years, with an increase in the capacity of a recording medium, it has become possible to record image data of a large number of still images and moving images obtained by a digital still camera and a camera-integrated video recorder, respectively. However, when it becomes possible to record image data of a large number of still images and moving images in a recording medium, if the user plays back, edits, etc., the image data, it becomes difficult to retrieve desired image data easily. Thus, Japanese Unexamined Patent Application Publication No. 2007-49332 has disclosed a method in which a feature of record target data is extracted at recording time, meta data based on the feature is stored, and desired data can be easily obtained by retrieving the meta data at playback time.

Also, there have been proposals for a method in which a face of a person is detected, and desired data is retrieved from a recording medium using the detected face as a keyword. For example, Japanese Unexamined Patent Application Publication No. 2005-33276 has disclosed a method in which a similarity between a detected face from playback target data and a face of a specific person is determined, and images including a face having a high similarity are played back in sequence. Also, Japanese Unexamined Patent Application Publication No. 2007-281858 has disclosed a method of extracting a partial moving image including the person from the playback target data by the user specifying a specific person in playback target data.

SUMMARY OF THE INVENTION

If a feature is extracted from recording target data at recording time, and meta data based on the feature is stored, which feature is used as a basis for storing meta data is preset at feature extracting time. Thus, when a feature allowing easy retrieval of desired data is not extracted, it is not possible to easily obtain desired data even if the meta data is retrieved. Also, when a lot of features have been extracted, and meta data based on the extracted features is stored, it is possible to easily obtain desired data by retrieving the meta data. However, when a lot of features have been extracted, it becomes not easy for the user to select and use a feature in order to obtain the desired data.

Also, in the method in which the similarity between a detected face from playback target data and a face of a specific person is determined, and images are played back on the basis of the determination result, an image of a specific person is specified from a playback-target image registration database. Thus, it is necessary to preset the playback-target image registration database in order to enable the user to specify a specific person's image. Further, if the number of persons registered in the playback-target image registration database becomes too large, it becomes difficult to specify a specific person's image easily.

Also, in the method of extracting a partial moving image including the person from the playback target data by the user specifying a specific person in playback target data, it becomes necessary to perform specification operation of a person in a moving image (or a still image) being played back and playback-target data. Accordingly, unless an image including a desired person is played back, it is difficult to specify the person, and thus it is not allowed to extract partial images including the desired person easily.

Accordingly, the present invention addresses the above-described and other problems. It is desirable to provide an image-data processing apparatus and an image-data processing method which enable the user to easily read desired image data from a recording medium.

According to an embodiment of the present invention, there is provided an image-data processing apparatus including: an imaging section capturing an image of a subject and generating image data; a feature-extraction processing section extracting a visual feature from the generated image data; a feature-comparison processing section comparing a visual feature, having been extracted from recorded image data in a recording medium and related to the recorded image data, with the visual feature extracted by the feature-extraction processing section; and a control section reading image data having the visual feature extracted by the feature-extraction processing section from the recording medium on the basis of the comparison result.

In this image-data processing apparatus, a visual feature is extracted from image data generated by the imaging section. For the visual feature, the following are used: a face detection result obtained by performing face detection, a result obtained by performing at least one of face attribute detection, person identification, and human body detection using the face detection result, and not only a person but an object detection result, etc. For example, image data and a visual feature extracted from the image data are recorded in the recording medium with a relationship. The visual feature extracted from image data generated by the imaging section is compared with visual features recorded in the recording medium. On the basis of the comparison result, image data having a visual feature extracted from image data generated by the imaging section is read from the recording medium. Also, the read image data may be concatenated into one file.

According to another embodiment of the present invention, there is provided a method of processing image data, including: capturing an image of a subject and generating image data; extracting a visual feature from the generated image data; comparing a visual feature, having been extracted from recorded image data in a recording medium and related to the recorded image data, with the extracted visual feature; and reading image data having the extracted visual feature from the recording medium on the basis of the comparison result.

By this invention, a comparison is made between a visual feature having been extracted from image data generated by capturing the image of a subject and visual features recorded in the recording medium. On the basis of the comparison result, image data having a visual feature extracted from the image data generated by the imaging section is read from the recording medium.

Accordingly, only by shooting a desired subject, it is possible to easily read image data including the desired subject from the recording medium without specifying a specific person from persons registered in a playback-target image registration database, or playing back an image including a specific person and performing a specification operation of the specific person in the image being played back.

BRIEF DESCRIPTION OF THE DRAWINGS

FIG. 6 is a diagram illustrating a format of accompanying data;

DESCRIPTION OF THE PREFERRED EMBODIMENTS

Figure 1:
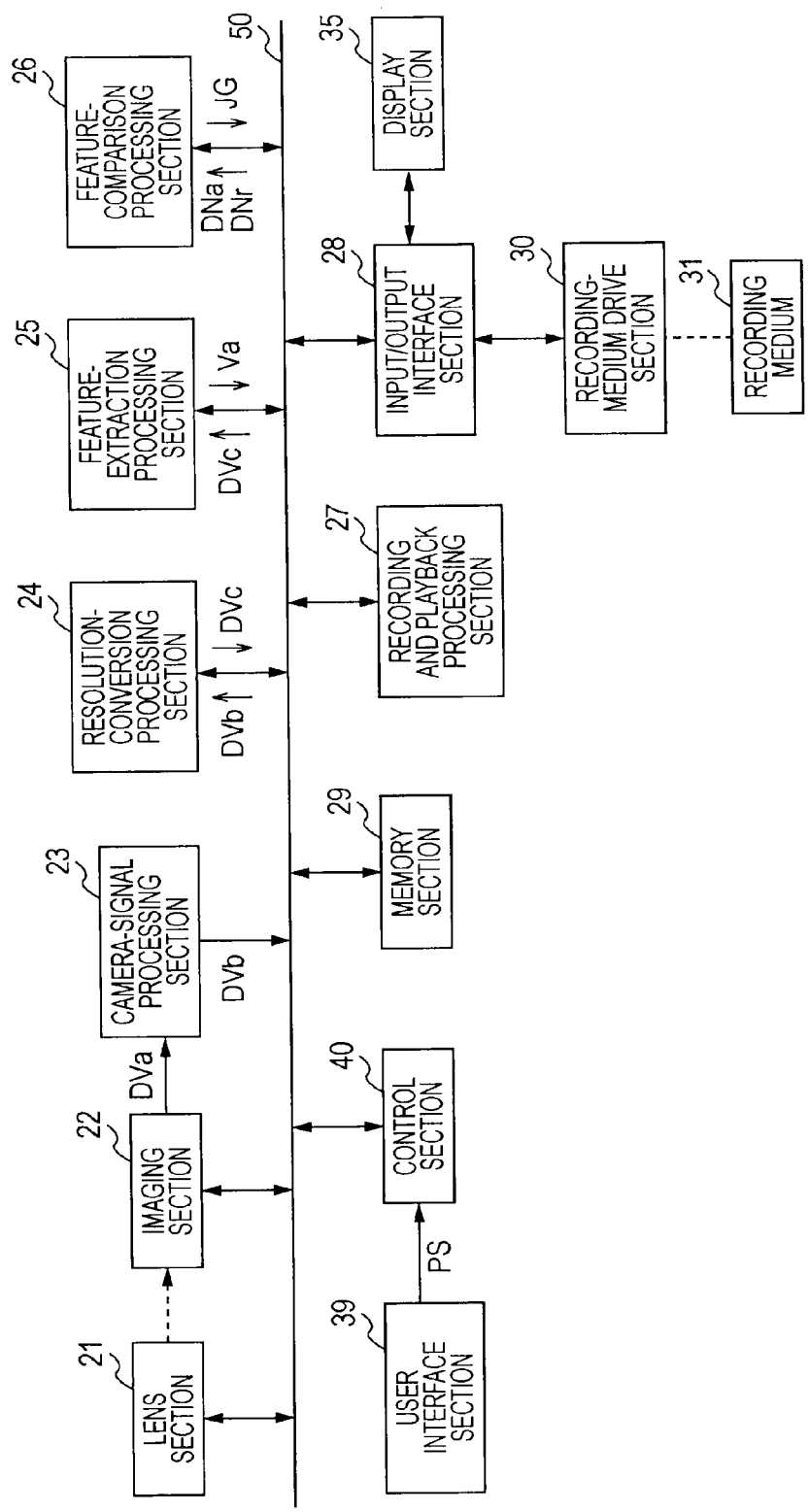
FIG. 1 is a diagram illustrating a configuration of an image-data processing apparatus.

In the following, a description will be given of an embodiment of the present invention with reference to the drawings. FIG. 1 illustrates a configuration of an image-data processing apparatus.

The image-data processing apparatus 10 includes a lens section 21, an imaging section 22, a camera-signal processing section 23, a resolution-conversion processing section 24, a feature-extraction processing section 25, a feature-comparison processing section 26, a recording and playback processing section 27, an input/output interface section 28, a memory section 29, a recording-medium drive section 30, a recording medium 31, a display section 35, a user interface section 39, and a control section 40. Also, the camera-signal processing section 23, the resolution-conversion processing section 24, the feature-extraction processing section 25, the feature-comparison processing section 26, the recording and playback processing section 27, the input/output interface section 28, the memory section 29, and the control section 40 are connected through a bus 50. Also, the recording-medium drive section 30, which records image data, etc., into and plays back image data, etc., from the recording medium 31, and the display section 35, which displays an image, a menu, etc., are connected to the input/output interface section 28.

The lens section 21 forms an image on an imaging surface of an imaging device included in the imaging section 22. The imaging section 22 captures an image of a subject, and generates image data DVa. The imaging section 22 includes an imaging device and a drive circuit for driving the imaging device, etc. The imaging section 22 generates an imaging signal by performing photoelectric conversion, etc. Also, the imaging section 22 eliminates noise of the imaging signal and adjusts the level of the imaging signal. Further, the imaging section 22 converts the analog imaging signal having been subjected to the noise elimination and the signal level adjustment, etc., into a digital signal, and supplies the digital signal to the camera-signal processing section 23 as the image data DVa.

The camera-signal processing section 23 performs matrix calculation for improving color reproducibility, knee correction for compressing a high-luminance portion, gamma correction for obtaining high-fidelity grayscale expression, detail processing for correcting an outline of a captured image, and the like. Also, the camera-signal processing section 23 supplies image data DVb after having been subjected to the signal processing to the resolution-conversion processing section 24 or the memory section 29.

The resolution-conversion processing section 24 converts the image data DVb supplied from the camera-signal processing section 23 or the image data DVb stored in the memory section 29 into image data DVc having a desired resolution. Further, the resolution-conversion processing section 24 stores the image data DVc after the conversion into the memory section 29.

The feature-extraction processing section 25 extracts a visual feature of the image data from the image data DVc stored in the memory section 29, and supplies a feature quantity Va indicating the extracted visual feature to the control section 40.

Figure 2:
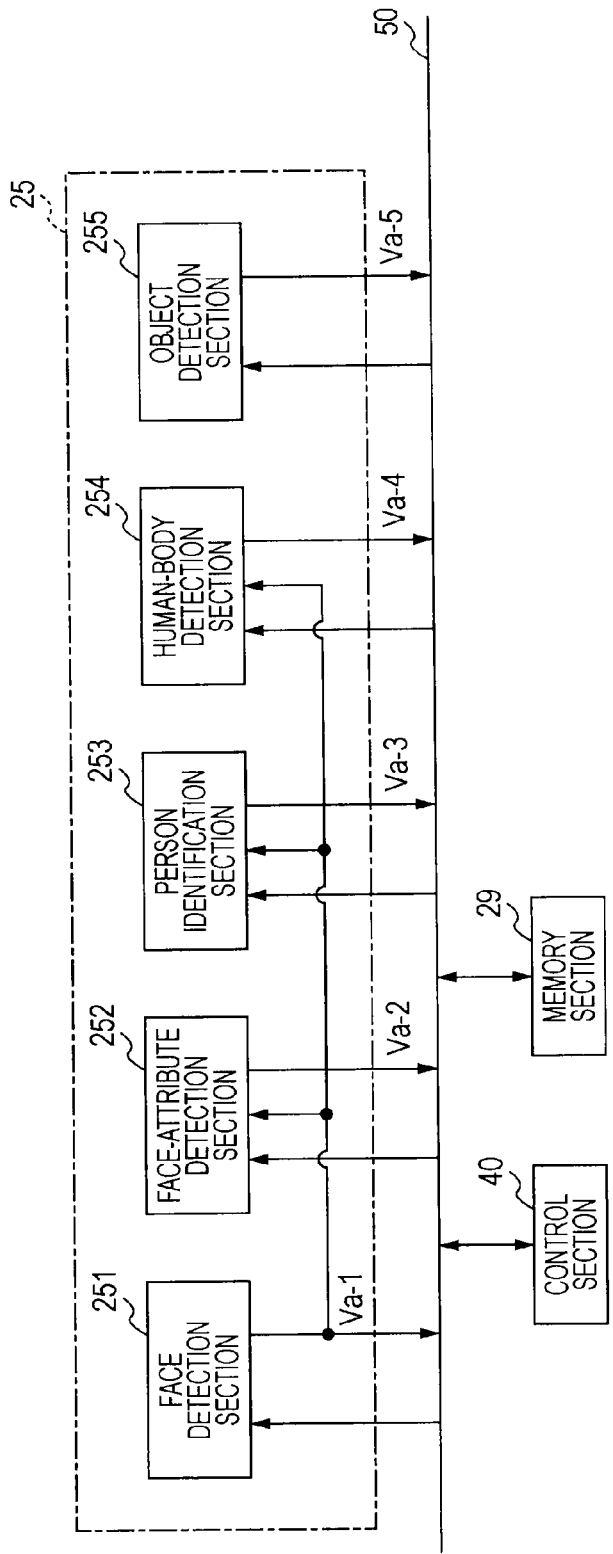
FIG. 2 is a diagram illustrating a configuration of the feature-extraction processing section.

FIG. 2 is a diagram illustrates a configuration of the feature-extraction processing section 25. The feature-extraction processing section 25 includes a face detection section 251, a face-attribute detection section 252, a person identification section 253, a human-body detection section 254, and an object detection section 255. The individual sections can be connected to the feature-comparison processing section 26, the memory section 29, and the control section 40 through the bus 50.

The detection section 251 detects a face portion of a person from the image based in the image data DVc. The detection section 251 detects the number of faces, the positions of the faces in the image, the sizes of the faces, etc., and notifies a detection result to the control section 40, the face-attribute detection section 252, the person identification section 253, and the human-body detection section 254 as a face detection result Va-1. The detection section 251 determines a flesh-colored area having a high matching degree with a face image template to be a face portion from the image based on the image data DVc, for example, and generates the face detection result Va-1 on the basis of the area determined to be the face portion.

The face-attribute detection section 252 detects face attributes from the face portion image shown by the face detection result Va-1 in the image based on the image data DVc. The face-attribute detection section 252 detects, a facial expression, blinking, whether a male or a female, whether an adult or a child, etc., as face attributes, and notifies a face-attribute detection result Va-2 to the control section 40. The face-attribute detection section 252 scores, for example, a degree of a facial expression (a smile face, etc.), a degree of blinking, etc., and determines the resultant score as a face-attribute detection result.

The person identification section 253 identifies the face-portion image indicated by the face detection result Va-1 in the image based on the image data DVc to be a face of a certain person, and notifies a person identification result Va-3 to the control section 40. The person identification section 253 scores the similarity between the face-portion image indicated by the face detection result Va-1 and a face image registered in advance, and determines the resultant score as a person identification result.

The human-body detection section 254 detects a human-body portion from the image based on the image data DVc, and notifies a human-body detection result Va-4 to the control section 40. The human-body detection section 254 detects, for example, a plurality of points of a human-body portion, for example, a joint portion, such as a shoulder, an elbow, a wrist, a knee, etc., connected to the face portion indicated by the face detection result Va-1, and determines the positions of the joint portions in the image as a human-body detection result.

The object detection section 255 detects an object other than a person from the image based on the image data DVc, and notifies an object-detection result Va-5 to the control section 40. The object detection section 255 determines, for example, the type of the detected object (a score indicating the similarity with an already identified object), the position of the object in the image, the size of the image indicating the object, etc., as an object-detection result.

In this regard, face detection, face attribute detection, person identification, human body detection, and object detection are not limited to the above-described methods, and the other various methods may be used for the detection. Also, the feature-extraction processing section 25 is not limited to the case where the above-described individual parts are used as constituent parts. Only some parts may be used as constituent parts. Alternatively, a new feature may be extracted. For example, constituent parts may be freely set depending on resources (a processing power, a hardware limitation size, an operating frequency, etc.) of an image-data processing apparatus.

The feature-comparison processing section 26 in FIG. 1 compares the feature extracted by the feature-extraction processing section 25 and a feature recorded in relationship to the image data in the recording medium 31. The feature-comparison processing section 26 has a storage section storing accompanying data of a comparison source and accompanying data of a comparison destination. As described later, the accompanying data is data, in a predetermined format, indicating a feature quantity representing a visual feature and a shooting condition (for example, shooting date and time, a zoom position, etc.). The feature-comparison processing section 26 compares accompanying data DNa representing the feature extracted by the feature-extraction processing section 25 and accompanying data DNr recorded in the recording medium 31 of the recording-medium drive section 30 connected to the input/output interface section 28, and stores the comparison result JG into a storage section of the feature-comparison processing section 26.

The recording and playback processing section 27 converts the image data DVc stored in the memory section 29 into coded data in a predetermined format, for example, JPEG, MPEG4, etc., and supplies the coded data to the recording-medium drive section 30 connected to the input/output interface section 28. Also, the recording and playback processing section 27 decodes data read from the recording medium 31 by the recording-medium drive section 30.

The input/output interface section 28 is an interface for connecting the recording-medium drive section 30 to the bus 50. The memory section 29 stores image data, or in some cases, a feature quantity Va, or a comparison result JG.

The recording-medium drive section 30 drives the recording medium 31, and writes data onto and read data from the recording medium 31. The recording medium 31 includes an optical disc, a magnetic disk, a semiconductor memory, or the like, and stores various kinds of data. The recording medium 31 may be removable from the recording-medium drive section 30. Alternatively, the recording medium 31 may be integrally included in the recording-medium drive section 30, and the recording-medium drive section 30 may be disposed in the image-data processing apparatus.

The display section 35 displays a still image, a moving image, and a menu for setting operations, etc., and the like. In this regard, the display section 35 may be disposed integrally with the image-data processing apparatus, or may be separately disposed with the image-data processing apparatus.

The user-interface section 39 includes an operation key, etc., generates an operation signal PS in accordance with a user's operation, and supplies the signal to the control section 40.

The control section 40 includes a CPU (Central Processing Unit), a ROM (Read Only Memory), a RAM (Random Access Memory), etc. The CPU executes programs recorded in the ROM or the RAM, and controls the operation of individual sections on the basis of the operation signal PS so that the image-data processing apparatus operates in accordance with the user's operation. For example, the CPU performs processing for reading desired image data from the recording medium 31 to play back the data, and processing for reading desired image data from the recording medium 31 to edit the data. Also, the control section 40 retrieves image data using the feature quantity Va (Va-1 to Va-5) at the time of reading desired image data from the recording medium 31.

Figure 3:
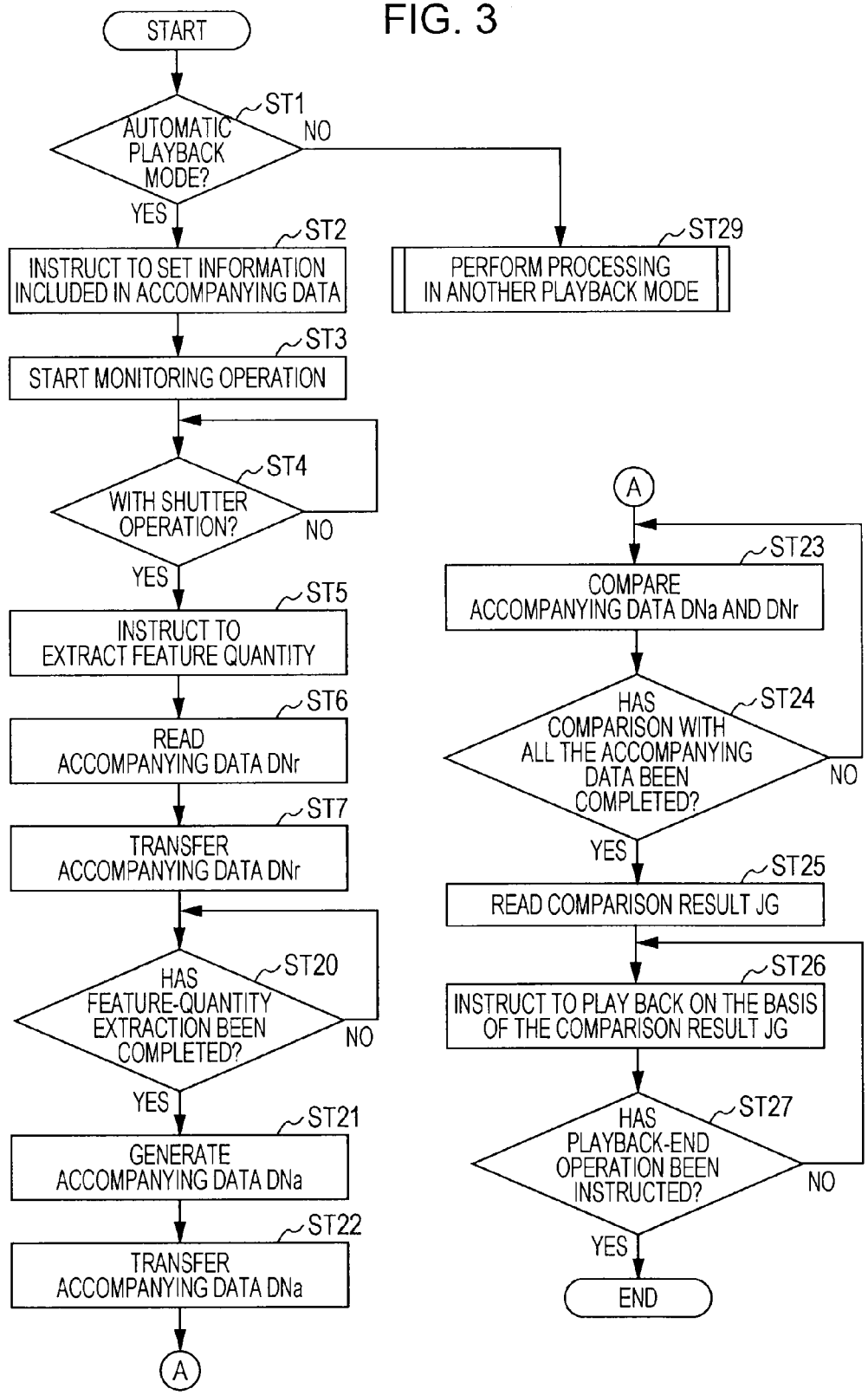
FIG. 3 is a flowchart illustrating an operation when a desired still image is automatically retrieved and reproduced in sequence.
Figure 4:
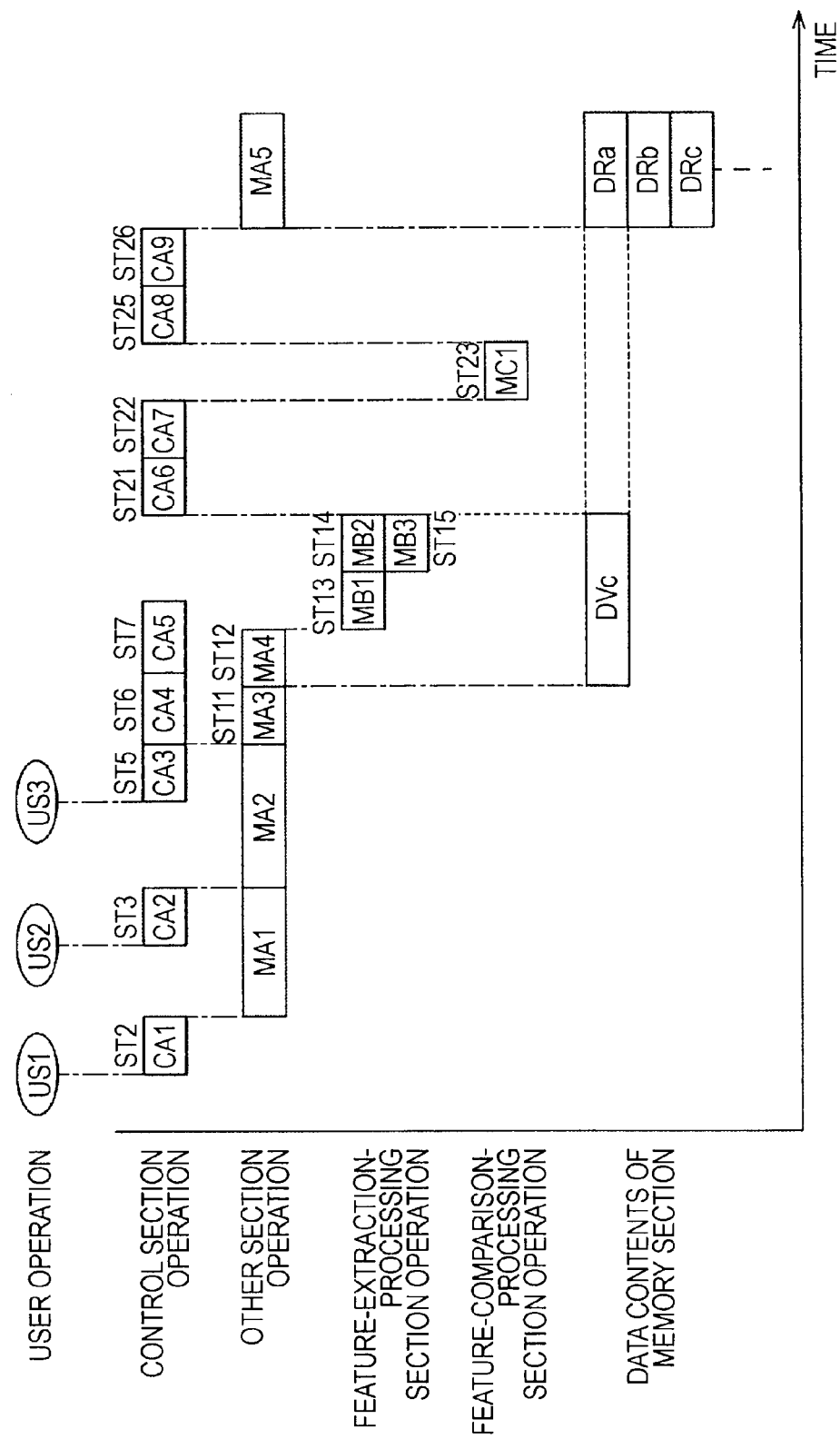
FIG. 4 is a processing process chart when a desired still image is automatically retrieved and reproduced in sequence.

Next, a description will be given of operation of the image-data processing apparatus. FIG. 3 is a flowchart illustrating the case where a desired still image is automatically retrieved from a recording medium and reproduced in sequence. FIG. 4 is an example of a processing process chart at this time. Specifically, the above-described case is necessary when a digital still camera storing a large number of still images including, such as a target person and the other persons, and scenes, is connected to an external monitor. For example, the above-described case occurs when only photographs including the target person with a smile face are automatically retrieved in order to display those photographs by a slide show. In this regard, an operation mode in which desired image is automatically retrieved and played back is called "automatic playback mode".

Also, the recording medium 31 in FIG. 1 stores not only the image data of the captured still image, but also the feature quantity obtained by the feature-extraction processing section 25 at the time of shooting the still image, and information indicating shooting conditions (for example, date and time, a zoom position, etc.), etc., as accompanying data DNr in a predetermined format, in relationship to the image data.

Here, when an image is retrieved, it is assumed that preset information is set for each operation mode. This preset information is information instructing what visual feature is extracted for the retrieval. That is to say, the preset information is information indicating the feature quantity on what item is used when a desired image is retrieved, or information indicating a condition on which feature quantity is to be retrieved, and what is the value of the feature quantity, etc., of the image to be retrieved. For example, the preset information includes, as items of the feature quantities, "file type" showing whether a file of an image data is a moving image file or a still image file, "face detection result", "face-attribute detection result", and "person identification result". In this case, when a desired image is retrieved, "file type", "face detection result", "face-attribute detection result", and "person identification result" are used as retrieval conditions. Also, the preset information may indicate not only a feature quantity item, but may indicate a feature quantity value, etc. For example, it is assumed that values of the feature quantities indicate "the file type is a still image", "the number of detected faces is a predetermined number or more", "the detected face attribute is a smile face", and "the identified person is a person to be retrieved". In this case, images to be retrieved satisfies the condition that the file type is a still image, the number of detected faces is a predetermined number or more, and the detected face attribute is a smile face. In this regard, the preset information may be set before an operation mode is selected. Alternatively, the preset information may be set or changed from the already set information at the time when an operation mode is selected.

In step ST1, the control section 40 determines whether the automatic playback mode is selected. When the control section 40 determines that the automatic playback mode is selected by the user's selection operation of the automatic playback mode (the user operation US1 in FIG. 4), the processing proceeds to step ST2. When another playback mode is selected, the processing proceeds to step ST29, and the control section 40 performs operation in another playback mode. In this regard, the operation mode is selected, for example, by the display section 35 of the image-data processing apparatus 10 displaying the selection menu of the operation mode, and allowing the user to select the automatic playback mode from the selection menu display.

In step ST2, the control section 40 instructs to set information included in the accompanying information (the operation CA1 of the control section in FIG. 4). The control section 40 allows the user to set not only the feature quantity indicated by the preset information, but also what other information is included in the accompanying data to be compared. The control section 40 displays a setting screen setting information in the display section 35, and, for example, allows the user to exclude identification of a person on the retrieval condition at the time of the automatic playback, and to set, as the retrieval condition, shooting information in order to compare the shooting condition, such as a shooting date and time and the zoom position, etc. (the operation MA1 of another section in FIG. 4). The user sets the shooting information included in the accompanying data (the user operation US2 in FIG. 4) in accordance with the setting screen. In this regard, in step ST2, the control section 40 may allow the user to set the preset information or to change the preset information having been set. Also, if the preset information has been already set and it is not necessary to set or to change the shooting information different from the preset information, the control section 40 is allowed to omit the processing of this step.

In step ST3, the control section 40 starts the monitoring operation, and the processing proceeds to step ST4. The control section 40 controls the operation of the lens section 21, the imaging section 22, the camera-signal processing section 23, the resolution-conversion processing section 24, etc., (the operation CA2 of the control section in FIG. 4), and displays the captured image on the display section 35 (the operation MA2 of another section in FIG. 4).

In step ST4, the control section 40 determines whether the shutter has been operated or not. If not operated, the processing returns to step ST4. If operated, the processing proceeds to ST5. The user generates image data for retrieving a desired still image. For example, when the user automatically retrieves only photographs on which a target person with a smile face is taken, the user performs shutter operation when the target person has a smile face (the user operation US3 in FIG. 4), and generates image data in which the target person with a smile face is taken.

In step ST5, the control section 40 instructs to extract a feature, and the processing proceeds to step ST6. The control section 40 instructs to extract a feature from the captured image when the shutter is operated (the operation CA3 of the control section in FIG. 4).

In step ST6, the control section 40 reads the accompanying data DNr recorded in the recording medium 31, and the processing proceeds to step ST7 (the operation CA4 of the control section in FIG. 4).

In step ST7, the control section 40 transfers the read accompanying data DNr to the feature-comparison processing section 26, and the processing proceeds to step ST20 (the operation CA5 of the control section in FIG. 4).

Figure 5:
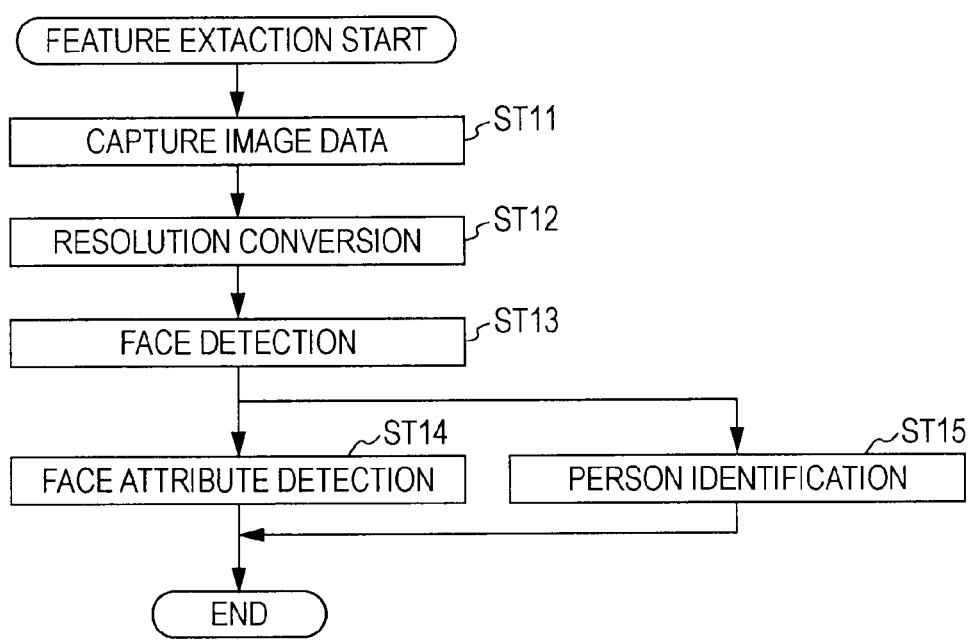
FIG. 5 is a flowchart illustrating a feature extraction operation when a desired still image is automatically retrieved and reproduced in sequence.

FIG. 5 is a flowchart illustrating a feature-quantity extraction operation when a desired still image is automatically retrieved and reproduced in sequence. When the control section 40 instructs to extract a feature, the camera-signal processing section 23 captures image data (the operation MA3 of another section in FIG. 4) in step ST11, stores the image data of the captured image when the shutter has been operated into the memory section 29, and the processing proceeds to step ST12.

In step ST12, the resolution-conversion processing section 24 performs resolution conversion on the image data stored in the memory section 29, and the processing proceeds to step ST13. The resolution-conversion processing section 24 converts the image data stored in the memory section 29 into the image having a resolution necessary for the feature-extraction processing section 25, and returns the image to the memory section 29 (the operation MA4 of another section in FIG. 4).

In step ST13, the face detection section 251 of the feature-extraction processing section 25 performs face detection. The face detection section 251 first detects a face of the person from the images of image data, which has been subjected to the resolution conversion. The face detection section 251 then detects the position of the face of the person and the size of the face, etc., in the image, and notifies the detection result to the control section 40 as the face detection result Va-1 (the operation MB1 of the feature-extraction processing section in FIG. 4).

In step ST14, the face-attribute detection section 252 of the feature-extraction processing section 25 performs face attribute detection. The face-attribute detection section 252 performs face-attribute detection on the face of the person detected in step ST13, and notifies the face-attribute detection result Va-2 to the control section 40 (the operation MB2 of the feature-extraction processing section in FIG. 4). Here, if the shutter is operated when the target person has a smile face, the score of a smile face in the detection result becomes large, and the score of the other attributes become small.

In step ST15, the person identification section 253 of the feature-extraction processing section 25 performs person identification. The person identification section 253 identifies the detected face in step ST13 as a someone's face, and notifies a person identification result Va-3 to the control section 40 (the operation MB3 of the feature-extraction processing section in FIG. 4).

By performing the processing of steps ST11 to ST15, a feature for retrieving a desired still image is obtained. That is to say, when only the photographs including the target person with a smile face is automatically retrieved, the feature corresponding to a smile face of the target person is obtained.

In step ST20 in FIG. 3, in the control section 40, a determination is made on whether a feature for retrieving a desired still image has been extracted or not. When the control section 40 has not completed the extraction of the feature, the processing returns to step ST20. If the extraction of the feature has been completed, the processing proceeds to step ST21.

In step ST21, the control section 40 generates the accompanying data DNa, and then processing proceeds to step ST22. The control section 40 generates the accompanying data DNa in the same format as the accompanying data DNr recorded in the recording medium 31 using the extracted feature (the operation CA6 of the control section in FIG. 4).

FIG. 6 illustrates an example of the format of the accompanying data. The accompanying data has, for example, data of "accompanying-data identification information", "file type", "the number of bytes from the beginning", "the number of detected faces", "face-attribute detection result", "person identification result", "human-body detection result", "the number of detected objects", and "detected-object identification result".

The accompanying-data identification information is disposed at the beginning of the accompanying data, and is a specific data string indicating that the data is accompanying data. The file type is data indicating whether the image data is of a still image or of a moving image. The number of bytes from the beginning indicates the number of bytes from the beginning of the recording medium to the position where the accompanying data is recorded. The number of detected faces is data indicating the number of faces detected by the face detection section 251 in an image frame.

Figure 7:
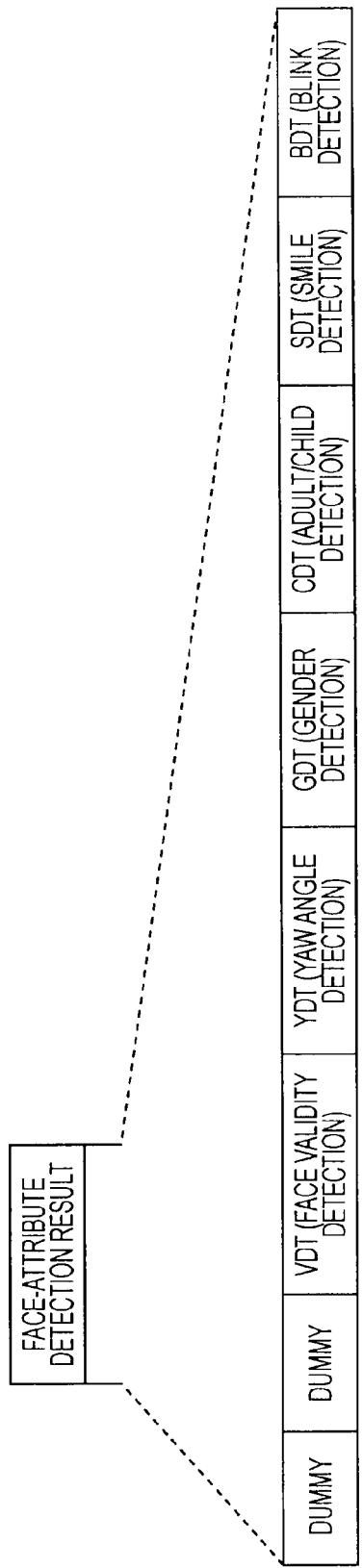
FIG. 7 is a diagram illustrating a face-attribute detection result.

The face-attribute detection result is data indicating the attributes of a face detected by the face-attribute detection section 252. FIG. 7 shows a face-attribute detection result. The face-attribute detection section 252 performs face validity detection, Yaw-angle detection, gender detection, adult/child detection, smile-face detection, blink detection, and indicates a face-validity detection result VDT, a Yaw-angle detection result YDT, a gender detection result GDT, an adult/child detection result CDT, a smile face detection result SDT, and a blink detection result BDT. In this face attribute detection, for example, a comparison result between the score of each attribute and the threshold value is used as each detection result.

The person identification result is data indicating identification information of a person identified by the person identification section 253 as the most similar person to the detected face from, for example, persons registered in advance.

Figure 8A:
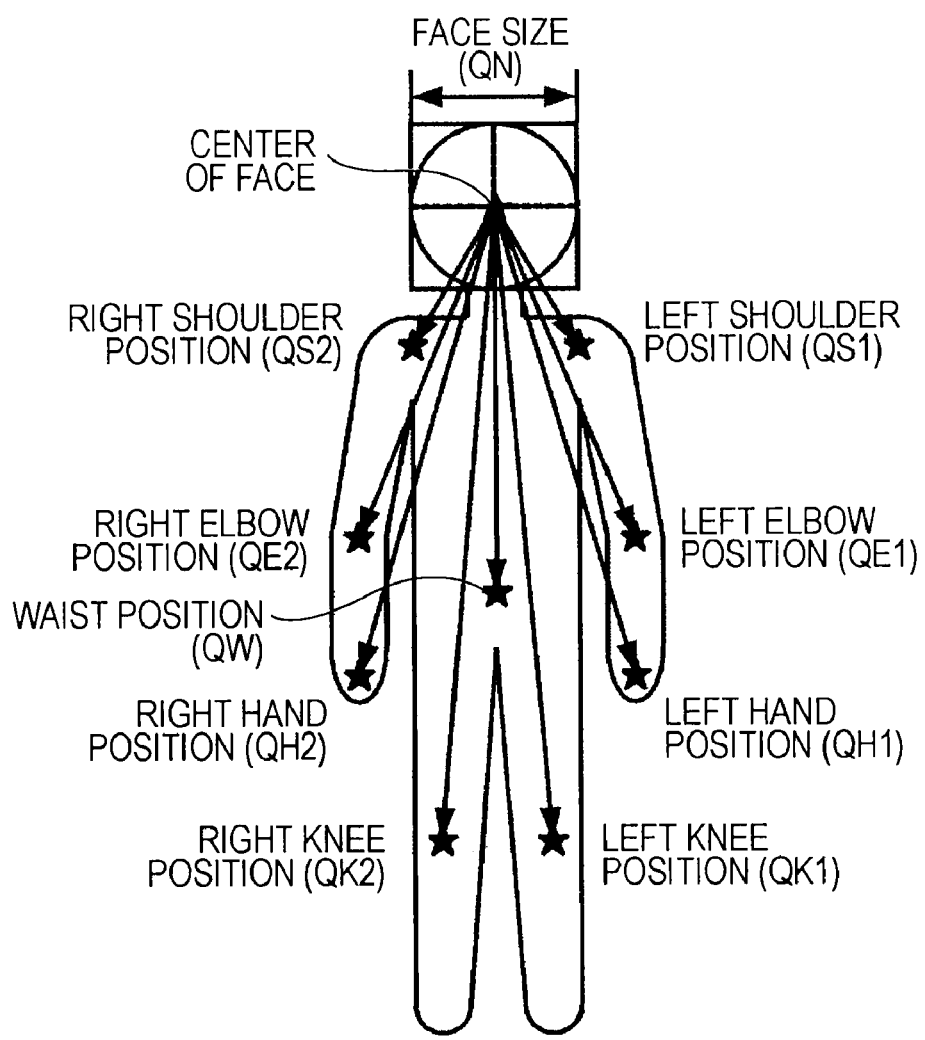
FIG. 8 is a diagram illustrating a human-body detection result.

The human-body detection result is data indicating the result of the detection by the human-body detection section 254. FIGS. 8A and 8B illustrate a human-body detection result. As shown in FIG. 8A, in the human-body detection, the following positions are detected on the basis of the center of a face: a left shoulder position (QS1), a right shoulder position (QS2), a left elbow position (QE1), a right elbow position (QE2), a left hand position (QH1), a right hand position (QH2), a waist position (QW), a left knee position (QK1), and a right knee position (QK2). As shown in FIG. 8B, the detection result of individual detection positions, for example, data indicating X-coordinates and Y-coordinates of individual detection positions from the center of the face, is determined to be a human-body detection result on the basis of the detection result. Here, distances from the center of the face to the individual positions of when a human body is located at a distant position become shorter than those of when the human body is located at a near position. Accordingly, the human-body detection result is data normalized in accordance with a face size (QN).

The object detection result is the number of detected objects is data indicating the number of objects detected by the object detection section 255 from an image frame. The detected-object identification result is data indicating identification information of an object identified by the object detection section 255 as the most similar detected object to an object registered in advance, for example.

In this regard, in FIG. 6, an example is shown of the case where the accompanying data DNa includes data of "accompanying-data identification information", "file type", "the number of bytes from the beginning", "the number of detected faces", "face-attribute detection result", "person identification result", "human-body detection result", "the number of detected objects", and "detected-object identification result". However, in the generation of the accompanying data DNa in each operation mode, accompanying data DNa indicating only necessary data for each operation mode is generated. For example, any one of face attributes detection, person identification, and human-body detection is performed using the face detection result. Next, these results are included in the visual feature, and then the accompanying data DNa indicating the visual feature is generated. Also, when only the preset information is set, and, as described above, when the items "file type" and "the number of detected faces", "attribute detection result", and "person identification result" as visual features are indicated, the accompanying data DNa indicating "accompanying-data identification information", "file type", "the number of bytes from the beginning", "the number of detected faces", "face-attribute detection result", and "person identification result" are generated.

In step ST22, the control section 40 performs processing transferring the generated accompanying data DNa to the feature-comparison processing section 26, and then the processing proceeds to step ST23 (the operation CA7 of the control section in FIG. 4).

In step ST23, the feature-comparison processing section 26 compares the accompanying data DNa and the accompanying data DNr, and the processing proceeds to step ST24. The feature-comparison processing section 26 compares the accompanying data DNa transferred in step ST22 and the accompanying data DNr transferred in step ST7 in accordance with the instruction of the comparison method from the control section 40, and retrieves a still image matching the retrieval condition. For example, a still image matching the retrieval condition is detected when the control section 40 gives an instruction for comparison such that a still image matching a retrieval condition is detected using a retrieval condition for an image captured at the time of the determination that a shutter is operated. That is to say, when an instruction is given to select a file name of a still image including the target person with a smile face, the feature-comparison processing section 26 compares the face-attribute detection result Va-2 and the person identification result Va-3 as comparison of the accompanying data, and detects the file names of the still images including the target person with a smile face (the operation MC1 of the feature-comparison processing section in FIG. 4).

In step ST24, the feature-comparison processing section 26 determines whether the comparison of all the accompanying data has been completed or not. If the feature-comparison processing section 26 has not completed the comparison processing of the accompanying data DNa transferred in step ST22 with all the accompanying data DNr transferred in step ST7, the processing returns to step ST23. If the comparison processing with all the accompanying data DNr has been completed, the processing proceeds to step ST25.

In step ST25, the control section 40 reads the comparison result JG of the accompanying data, and the processing proceeds to step ST26. The control section 40 reads the comparison result JG of the accompanying data from the feature-comparison processing section 26, that is to say, a file name of a still image matching the retrieval condition (the operation CA8 of the control section in FIG. 4).

In step ST26, the control section 40 instructs to play back on the basis of the comparison result JG of the accompanying data, and the processing proceeds to step ST27. The control section 40 notifies the file name indicated by the comparison result JG of the accompanying data to the recording and playback processing section 27, and makes the recording and playback processing section 27 to play back still images of the file names indicated by the comparison result in sequence (the operation CA9 of the control section in FIG. 4). The playback of the retrieved still images may be in sequence in the order of being stored in the comparison result, or may be in a random order in sequence. Also, a plurality of playback images may be displayed at the same time, or special effects may be inserted between playback images. In this regard, a plurality of playback images may sometimes be disposed in the memory sec 29 depending on the playback operations.

The recording and playback processing section 27 reads the image data having the file name indicated by the comparison result JG of the accompanying data from the recording medium, stores the image data into the memory section 29, and performs processing to supply image data DRa, DRb, DRc, . . . , to the display section 35 (the operation MA5 of another section in FIG. 4).

In step ST27, the control section 40 determines whether the playback end operation has been performed. If the control section 40 determines that the playback end operation has not been performed, the processing returns to step ST26. If the control section 40 determines that the playback end operation has been performed, the playback operation is terminated.

In this regard, in the above-described operation, the accompanying data DNr recorded in the recording medium 31 is read once, and is transferred to the feature-comparison processing section 26 in order to compare the accompanying data. However, if the capacity of the accompanying data is large, the accompanying data DNr recorded in the recording medium 31 is read and compared with the accompanying data by the capacity that can be processed by the feature-comparison processing section 26.

In this manner, only if the user selects the automatic playback mode, and captures the image of the target person with a smile face, it becomes possible to search for a still image including the target person with a smile face from a large number of still images stored in the recording medium 31, and to read the image data of the still image to be automatically played back.

In this regard, it is possible to perform the processing of steps ST6 and ST7, that is to say, the reading of the accompanying data recorded in the recording medium 31 and transferring the read accompanying data to the feature-comparison processing section 26 may be performed before the shutter operation is carried out. However, if the user stops the playback operation without performing the shutter operation, the reading and the transferring of the accompanying data become invalid. Accordingly, it is preferable to read and transfer the accompanying data after the shutter operation is carried out.

In the above-described embodiment, a description has been given of the case where a still image is recorded in the recording medium 31. However, in the case where a moving image is recorded, it is possible to retrieve a desired moving image in the same manner.

Figure 9:
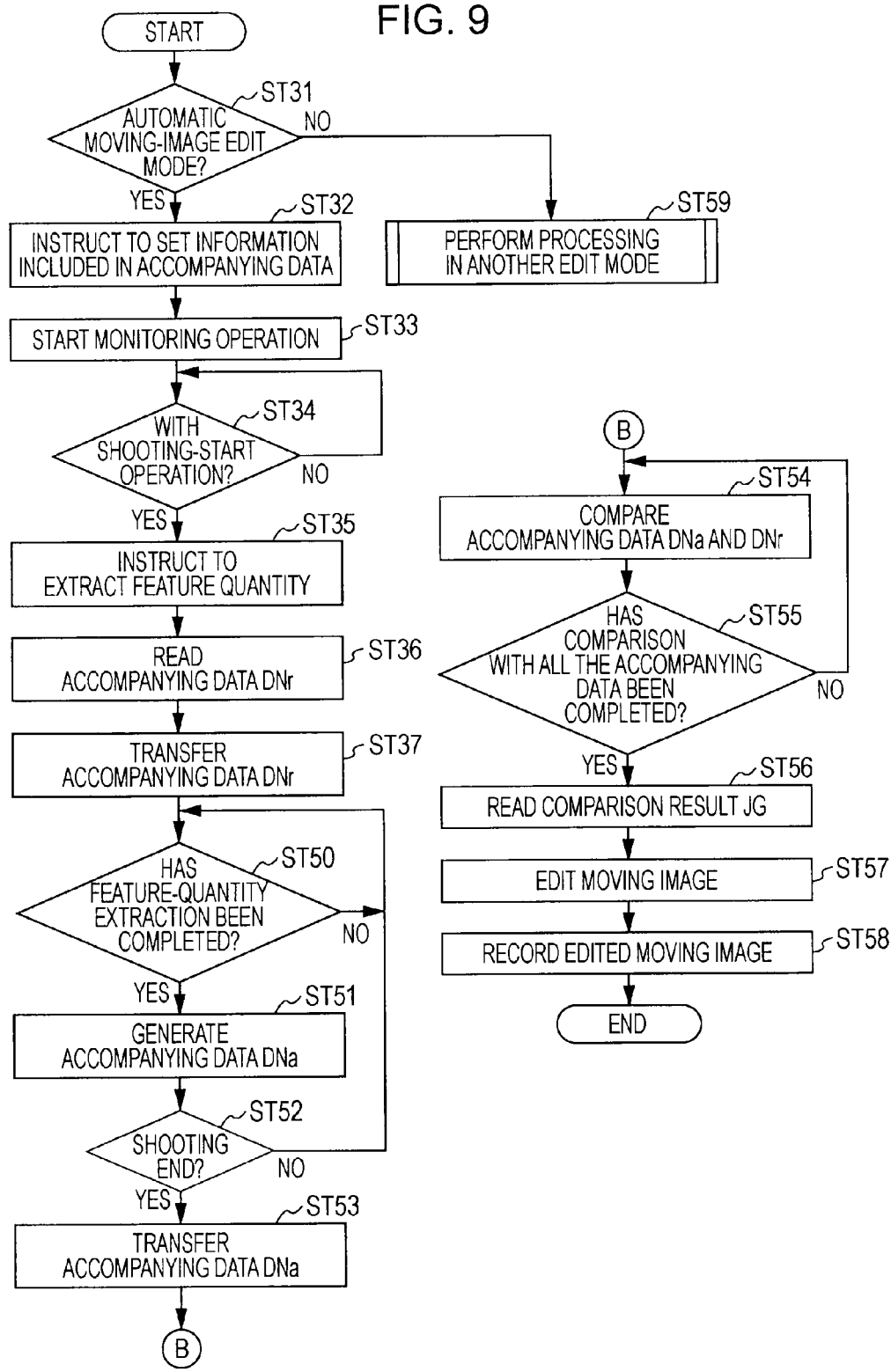
FIG. 9 is a flowchart illustrating an operation when a desired moving image is automatically read and edited.
Figure 10:
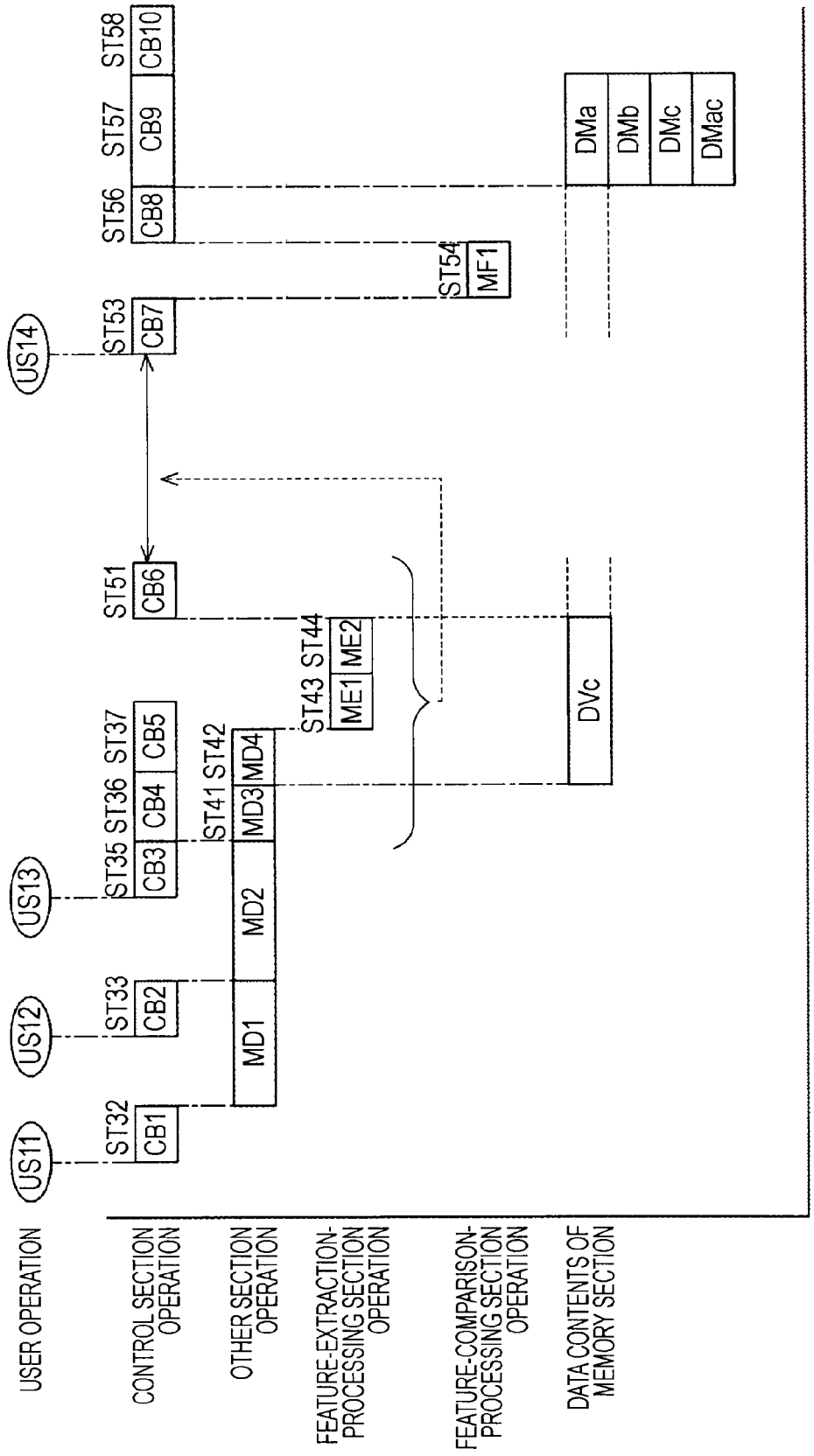
FIG. 10 is a processing process chart when a desired moving image is automatically read and edited.

Next, a description will be given of the case where a desired moving image is automatically retrieved from the moving image recorded in the recording medium 31. FIG. 9 is a flowchart illustrating an operation when a desired moving image is automatically read from the recording medium and edited. FIG. 10 is an example of a processing process chart at this time. Specifically, such a case occurs when a desired moving image is edited from a camera-integrated video recorder in which a large number of moving images are recorded. For example, the above case occurs when the user wants to extract only all the scenes of a certain person performing golf swing. In this regard, the operation mode in which a desired moving image is automatically retrieved from the recording medium 31 and edited is called an "automatic moving-image edit mode".

Also, it is assumed that not only the image data of the captured moving image, but a feature quantity obtained by the feature-extraction processing section 25 and information indicating a shooting condition (for example, shooting date and time, a zoom position, etc.), and the like, are stored in the recording medium 31 in FIG. 1 as the accompanying data DNr having a predetermined format in relationship to the image data.

In step ST31, the control section 40 determines whether the automatic moving-image edit mode is selected or not. When the control section 40 determines that the automatic moving-image edit mode is selected by the user's selection operation of the automatic moving-image edit mode (the user operation US11 in FIG. 10), the processing proceeds to step ST32. Also, when another edit mode is selected, the processing proceeds to step ST59, and the control section 40 performs operation in another edit mode. In this regard, the edit operation mode is selected, for example, by the display section 35 of the image-data processing apparatus 10 displaying the selection menu of the edit mode, and allowing the user to select the automatic moving-image edit mode from the selection menu display.

In step ST32, the control section 40 instructs to set information included in the accompanying information (the operation CB1 of the control section in FIG. 4). The control section 40 allows the user to set not only the feature quantity indicated by the preset information, but also what other information is included in the accompanying data to be compared. The control section 40 displays a setting screen setting information in the display section 35, and, for example, allows the user to select only an upper half of the body as the retrieval condition at the time of the moving-image edit mode, and to set shooting information in order to compare the shooting condition, such as a shooting date and time and the zoom position, etc. (the operation MD1 of another section in FIG. 10). The user sets the shooting information including the accompanying data (the user operation US12 in FIG. 10). In this regard, in step ST32, the control section 40 may allow the user to set the preset information or may change the preset information having been set. Also, when the preset information has been already set and it is not necessary to set or to change a shooting information different from the preset information, the control section 40 is allowed to omit the processing of this step.

In step ST33, the control section 40 starts the monitoring operation, and the processing proceeds to step ST34. The control section 40 controls the operation of the lens section 21, the imaging section 22, the camera-signal processing section 23, the resolution-conversion processing section 24, etc., (the operation CB2 of the control section in FIG. 10), and displays the captured image on the display section 35 (the operation MD2 of another section in FIG. 10).

In step ST34, the control section 40 determines whether the image-capturing start operation has been carried out or not. If the image-capturing start operation has not been carried out, the processing returns to step ST34. If the operation has been carried out, the processing proceeds to ST35. The user generates image data for retrieving a desired moving image. For example, the operation of a subject in a state near a desired image is captured from the moving image recorded in the recording medium 31 as the captured image. The capturing the image is carried out by operating the recording start button of the video camera at the time of starting and ending the image capture in the same manner as capturing a moving image. Specifically, the video camera is directed to the person to be retrieved, and the recording start button is operated (the user operation US13 in FIG. 10) at the same time of the start of the operation of the person's golf swing in order to change the operation from the monitoring operation to the image capturing operation.

In step ST35, the control section 40 instructs to extract a feature, and the processing proceeds to step ST36. The control section 40 instructs to extract a feature from the image captured after the image capturing operation has been started by the recording start button having been operated (the operation CB3 of the control section in FIG. 10).

In step ST36, the control section 40 reads the accompanying data DNr recorded in the recording medium 31, and the processing proceeds to step ST37 (the operation CB4 of the control section in FIG. 10).

In step ST37, the control section 40 transfers the read accompanying data DNr to the feature-comparison processing section 26, and the processing proceeds to step ST50 (the operation CB5 of the control section in FIG. 10).

Figure 11:
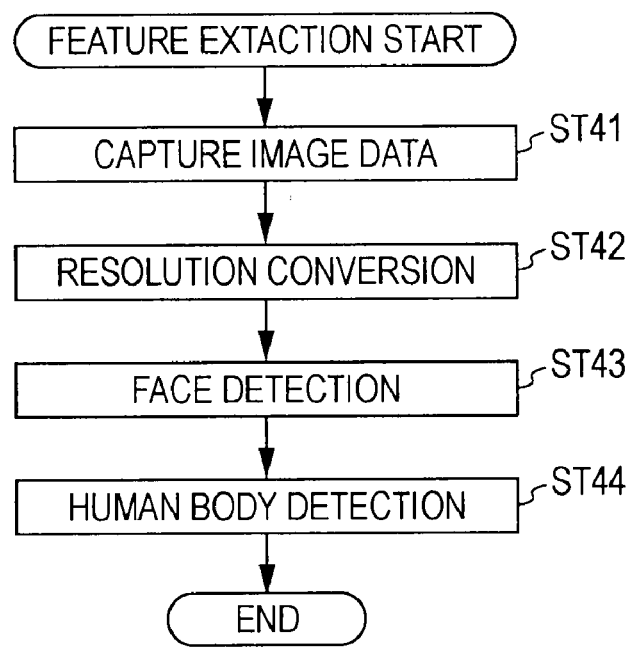
FIG. 11 is a flowchart illustrating a feature extraction operation when a desired moving image is automatically read and edited.

FIG. 11 is a flowchart illustrating a feature-quantity extraction operation when a desired moving image is automatically read and is edited in sequence. When the control section 40 instructs to extract a feature, the camera-signal processing section 23 captures image data (the operation MD3 of another section in FIG. 10) in step ST41, stores the image data of the captured image into the memory section 29, and the processing proceeds to step ST42.

In step ST42, the resolution-conversion processing section 24 performs resolution conversion on the image data stored in the memory section 29, and the processing proceeds to step ST43. The resolution-conversion processing section 24 converts the image data stored in the memory section 29 into the image having a resolution necessary for the feature-extraction processing section 25, and returns the image to the memory section 29 (the operation MD4 of another section in FIG. 10).

In step ST43, the face detection section 251 of the feature-extraction processing section 25 performs face detection, and the processing proceeds to step ST44. The face detection section 251 detects a face of the person from the images of image data, which has been subjected to the resolution conversion. The face detection section 251 then detects the position of the face of the person and the size of the face, etc., in the image, and notifies the detection result to the control section 40 as the face detection result Va-1 (the operation ME1 of the feature-extraction processing section in FIG. 10).

In step ST44, the human-body detection section 254 of the feature-extraction processing section 25 detects a human-body. The human-body detection section 254 detects a human-body portion connected to the face of the person detected by step ST43, and notifies a human-body detection result Va-4 to the control section 40 (the operation ME2 of the feature-extraction processing section in FIG. 10). The human-body detection section 254 detects, for example, the positions of the joint portions in the image, such as a shoulder, an elbow, a wrist, a knee, etc., as the human-body detection result Va-4.

By performing the processing of steps ST41 to ST44, a feature for retrieving a desired moving image is obtained. That is to say, when a moving image of the person's golf swing is automatically retrieved, the feature corresponding to the person's golf swing is obtained.

In step ST50 in FIG. 9, in the control section 40, a determination is made on whether a feature for retrieving a desired moving image has been extracted or not. When the control section 40 has not completed the extraction of the feature, the processing returns to step ST50. If the extraction of the feature has been completed, the processing proceeds to step ST51.

In step ST51, the control section 40 generates the accompanying data DNa, and then processing proceeds to step ST52. The control section 40 generates the accompanying data DNa in the same format as the accompanying data DNr recorded in the recording medium 31 using the extracted feature (the operation CB6 of the control section in FIG. 10). In this regard, in the generation of the accompanying data DNa in each operation mode, the accompanying data DNa only necessary for each operation mode ought to be generated. For example, when only preset information is set, and, if the items "file type" and "the number of detected faces", and "human-body detection result" are indicated and information other than the preset information is not set, the accompanying data indicating accompanying-data indicating "file type", "the number of detected faces", and "human-body detection result" is generated.

In step ST52, the control section 40 determines whether the image capturing end operation has been performed. If the control section 40 determines that, for example, the recording stop operation has not been performed, the processing returns to step ST50. If the recording stop operation has been performed (the user operation US14 in FIG. 10) to terminate the image capturing operation, the processing proceeds to step ST53. That is to say, the processing of steps ST41 to ST44 and steps ST50 to ST51 is repeated, and the accompanying data DNa is generated for each captured image.

In step ST53, the control section 40 performs processing transferring the generated accompanying data DNa to the feature-comparison processing section 26, and then the processing proceeds to step ST54 (the operation CA7 of the control section in FIG. 10).

In step ST54, the feature-comparison processing section 26 compares the accompanying data DNa and the accompanying data DNr, and the processing proceeds to step ST55. The feature-comparison processing section 26 compares the accompanying data DNa transferred in step ST53 and the accompanying data DNr transferred in step ST37 in accordance with the instruction for the comparison from the control section 40, and retrieves a position of the moving image matching the retrieval condition. For example, a position of the moving image is detected when the control section 40 gives an instruction for the comparison such that a moving image matching the retrieval condition is detected using a retrieval condition of a captured image at the time of determination that the retrieval condition is the captured image from the start to the end of the image capturing operation. That is to say, when an instruction is given to select a file name and a position of the partial moving image of a moving image including the partial moving image of the target person's golf swing, the feature-comparison processing section 26 compares the face-attribute detection result Va-1 and the human-body detection result Va-4 as comparison of the accompanying data, and detects the file names of the moving image including the target person's golf swing and the position of the partial moving image (the operation MF1 of the feature-comparison processing section in FIG. 10).

In step ST55, the feature-comparison processing section 26 determines whether the comparison of all the accompanying data has been completed or not. If the feature-comparison processing section 26 has not completed the comparison processing of the accompanying data DNa transferred in step ST53 with all the accompanying data DNr transferred in step ST37, the processing returns to step ST54. If the comparison processing with all the accompanying data DNr has been completed, the processing proceeds to step ST56.

In step ST56, the control section 40 reads the comparison result JG of the accompanying data, and the processing proceeds to step ST57. The control section 40 reads the comparison result JG of the accompanying data from the feature-comparison processing section 26, that is to say, a file name of a moving image matching the retrieval condition (the operation CB8 of the control section in FIG. 10).

In step ST57, the control section 40 edits moving image on the basis of the comparison result JG of the accompanying data (the operation CB9 of the control section in FIG. 10). The control section 40 reads image data of the partial moving image matching the retrieval condition from the image data of the file name indicated by the comparison result of the accompanying data from the recording medium 31, and performs the concatenation processing, and the processing proceeds to step ST58.

Figure 12:
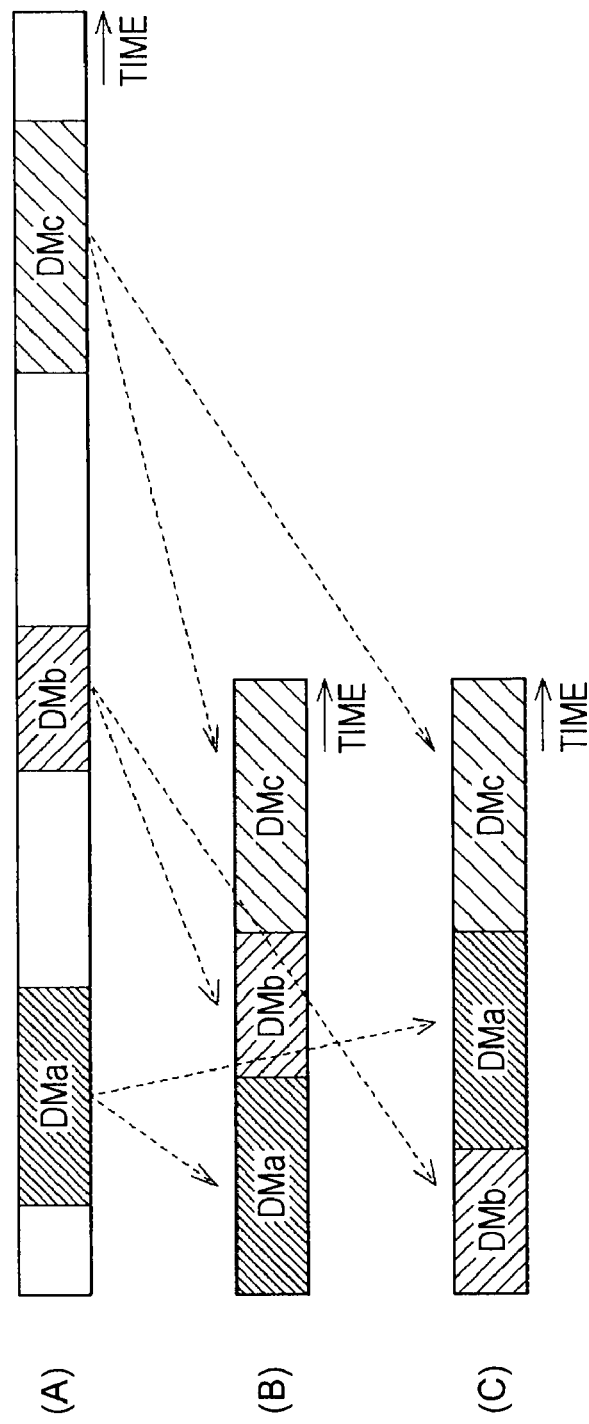
FIG. 12 is a diagram for illustrating an edit operation.

FIG. 12 illustrates a concept of moving-image edit. FIG. 12(A) indicates a moving image recorded in the recording medium 31. The shade portions indicate partial moving images DMa, DMb, and DMc matching the retrieval condition indicated by the comparison result of the accompanying data.

As shown in FIG. 12(B), the control section 40 concatenates the partial moving images matching the retrieval condition in the order of recorded time in the recording medium 31, that is to say, in the order of the partial moving images DMa, DMb, and DMc. Also, as shown in FIG. 12(C), the control section 40 may concatenate the partial moving images matching the retrieval condition at random. For example, the partial moving images may be concatenated in the order of DMb, DMa, and DMc. The concatenated moving-image file is stored in the memory section 29 each time the files are concatenated (DMac in FIG. 10).

In step ST58 in FIG. 9, after editing the moving images, the control section 40 adds a header, etc., to the image data file (DMac in FIG. 10) after the edit and stored in the memory section 29, and writes the data file into the recording medium 31 as an edited file (the operation CB10 of the control section in FIG. 10). After that, the control section 40 changes to a normal playback mode, etc., and the processing of the edit mode is terminated.

In this regard, in the above-described operation, the accompanying data DNr recorded in the recording medium 31 is read once, and is transferred to the feature-comparison processing section 26 in order to compare the accompanying data. However, if the capacity of the accompanying data is large, the accompanying data DNr recorded in the recording medium 31 is read and compared with the accompanying data by the capacity that can be processed by the feature-comparison processing section 26. Also, in the same manner, if accompanying data becomes larger than the capacity of data that can be processed once during the generation of part of the accompanying data, the part of the accompanying data during generation is transferred to the memory section 29, and when the image-capturing end operation is carried out, the transfer of the accompanying data to the feature-comparison processing section 26 is performed for each capacity that can be processed by the feature-comparison processing section 26.

Also, it is possible to perform the processing of steps ST36 and ST37, that is to say, the reading of the accompanying data and the transferring of the read accompanying data to the feature-comparison processing section 26 may be performed before the image-capturing operation is carried out. However, if the user stops the playback operation without performing the edit operation, the reading and the transferring of the accompanying data become invalid. Accordingly, it is preferable to read and transfer the accompanying data after the image-capturing operation is carried out.

In this manner, only if the user selects the automatic moving-image edit mode, and captures the image of the operation of a person's golf swing for example, it becomes possible to search for a partial moving image of the person's golf swing from a large number of moving images stored in the recording medium, and to automatically edit the images.

Also, a subject to be retrieved is not limited to a person, and an object other than a person may be detected in order to play back or edit the image. For example, when a still image including a small animal is read from a recording medium to be played back in sequence, the image of the target small animal (or a toy animal similar to the small animal) is captured, and a feature is extracted by the object detection section 255 using the image data of the still image at this time. Further, the accompanying data is generated using the extracted feature, and it is possible to read and reproduce still images including the small animal in sequence by using the comparison result between the generated accompanying data and the accompanying data recorded in the recording medium 31.

Also, the above-described image-data processing apparatus may be formed using an imaging apparatus and a computer apparatus. In this case, the programs to be executed on a computer apparatus includes a step of extracting a visual feature from the image data generated by the imaging apparatus, a step of comparing the extracted visual feature and the visual feature recorded in the recording medium in relationship to the image data, and a step of reading the image data indicating the extracted visual feature from the recording medium on the basis of the comparison result. By executing the programs, the computer apparatus retrieves a desired image from the still images and the moving images recorded in the recording medium on the basis of the captured image generated by the imaging apparatus, then reads the image data of the retrieved images, and plays back and edits the image data.

In this regard, the programs can be provided by a storage medium, such as an optical disc, a magnetic disk, a semiconductor memory, etc., in a computer-readable format for a general-purpose computer capable of executing various kinds of program code, for example, or through a communication medium, such as a network, etc.

The present application contains subject matter related to that disclosed in Japanese Priority Patent Application JP 2008-174640 filed in the Japan Patent Office on Jul. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image-data processing apparatus comprising:
   an imaging unit configured to capture a moving image of a subject and generate image data; and
   a processor programmed to
   extract a visual feature from the generated image data,
   detect a face of a person,
   determine an identity of a person and whether the person is a child or an adult based on the detected face, the detection and determining result being included in the visual feature;
   compare a corresponding visual feature, extracted from recorded image data in a recording medium and related to the recorded image data with the extracted visual feature,
   read image data having the extracted visual feature from the recording medium based on the comparison result, and
   concatenate, into a concatenated moving image file, all image data having the extracted visual feature.

2. The image-data processing apparatus according to claim 1, wherein the processor is further programmed to
   perform at least one of a face detection, a face attribute detection, a person identification, or a human body detection using the face detection result, and
   include an obtained result in the visual feature.

3. The image-data processing apparatus according to claim 1, wherein the processor is further programmed to extract the visual feature on the basis of preset information identifying a particular visual feature to be extracted.

4. The image-data processing apparatus according to claim 3, wherein the processor is further programmed to
   use imaging information different from the preset information,
   compare the imaging information related to the generated image data with imaging information related to the image data recorded in the recording medium, and
   read the image data indicating imaging information related to the extracted visual feature and the generated image data from the recording medium on the basis of the comparison result.

5. The image-data processing apparatus according to claim 1, wherein the processor is further programmed to
   record the image data generated by the imaging unit onto the recording medium, and
   record the extracted visual feature in association with the image data.

6. A method of processing image data, comprising:
   capturing a moving image of a subject and generating image data;
   extracting a visual feature from the generated image data;
   detecting a face of a person;
   determining an identity of a person and whether the person is a child or an adult based on the detected face, the detection and determining result being included in the visual feature;
   comparing a corresponding visual feature, having been extracted from recorded image data in a recording medium, with the extracted visual feature;
   reading image data having the extracted visual feature from the recording medium based on the comparison result; and
   concatenating, into a concatenated moving image file, all image data having the visual feature.

7. A non-transitory computer readable medium having computer readable instructions thereon that when executed by a computer cause the computer to perform an image display method comprising:
   capturing a moving image of a subject and generating image data;
   extracting a visual feature from the generated image data;
   detecting a face of a person;
   determining an identity of a person and whether the person is a child or an adult based on the detected face, the detection and determining result being included in the visual feature;
   comparing a corresponding visual feature, having been extracted from recorded image data in a recording medium, with the extracted visual feature;
   reading image data having the extracted visual feature from the recording medium based on the comparison result; and
   concatenating, into a concatenated moving image file, all image data having the visual feature.

8. The image-data processing apparatus according to claim 2, wherein the face attribute detection is at least one of a face validity detection, a yaw angle detection, a gender detection, a smile detection, and a blink detection.

9. The image-data processing apparatus according to claim 2, wherein the human-body detection detects at least one of a left shoulder position, a right shoulder position, a left elbow position, a right elbow position, a left hand position, a right hand position, a waist position, a left knee position, and a right knee position.

10. The image-data processing apparatus according to claim 9, wherein the human-body detection result determines X-coordinates and Y-coordinates identifying distances from the center of the face to at least one of a left shoulder position, a right shoulder position, a left elbow position, a right elbow position, a left hand position, a right hand position, a waist position, a left knee position, and a right knee position.

11. The image-data processing apparatus according to claim 1, wherein the concatenating is in an order of recording times of the all image data having the visual feature.

12. The image-data processing apparatus according to claim 2, wherein the concatenating is in an order of recording times of the all image data having the visual feature.

13. The image-data processing apparatus according to claim 1, wherein the processor is further programmed to
    perform a face detection, a face attribute detection, a person identification, and a human body detection using the face detection result, and
    include an obtained result in the visual feature.

14. The image-data processing apparatus according to claim 1, wherein only image data having the extracted visual feature is concatenated into the concatenated moving image file.

* * * * *